Oct. 20, 1953  G. J. LIDDELL  2,656,177
ENGINE OIL CONSUMPTION APPARATUS
Filed March 8, 1950

INVENTOR.
GEORGE J. LIDDELL
BY
*Busser and Harding*
ATTORNEYS

Patented Oct. 20, 1953

2,656,177

UNITED STATES PATENT OFFICE 2,656,177

ENGINE OIL CONSUMPTION APPARATUS

George J. Liddell, Springfield, Pa., assignor to Sun Oil Company, Philadelphia, Pa., a corporation of New Jersey Application March 8, 1950, Serial No. 148,469

1 Claim. (Cl. 265—60)

This invention relates to apparatus for determining and indicating continuously the oil consumption in internal combustion engines. In particular the invention is concerned with apparatus adapted to be operated in conjunction with an internal combustion engine, which is in operation, in order to measure the amount of oil consumed by the engine over a predetermined period of time.

Various systems for determining oil consumption have been employed in the past which have yielded results of varying accuracy. Most common is the volumetric method, wherein the engine crankcase or external oil system is supplied at the start of a test with a measured volume of oil, and at the end of the test the remaining oil is drained and its volume determined; the difference between the volume supplied and the volume remaining representing the volume consumed during the test. The same procedure may also be followed, except using weight determinations instead of volume determinations at the beginning and end of the test. Either of these methods may give quite accurate results if the difference between the two quantities measured is large with respect to the actual quantities involved; that is, if the amount consumed is a reasonably large percentage of the oil system capacity. Otherwise, the small difference between two large quantities is of doubtful significance. Further, these methods give no indication of variations in rate of oil consumption which may have occurred during the test due to changing conditions.

The present invention provides for determination of variations in oil consumption rate by employing an oil receptacle external of the engine, with oil supplied to the engine under pressure by pumping means, and scavenge oil from the engine returned to the receptacle by other pumping means. By mounting the receptacle on a scale and connecting it by flexible lines to the engine oil system, a scale reading at any time while the engine is running may be taken as representative of the amount of oil remaining unused, and increments of oil consumption may be determined at convenient intervals over known periods of time. This is a decided advantage over the systems above mentioned since the results are more accurate and the periods of operation are more flexible.

The system of the present invention is directed to the idea of measuring oil consumption in an engine without modifying the oiling system of the engine in any material manner. The engine is operated under known conditions, such as that of water and oil temperature and pressure, engine speed, etc. and the oil consumption during any desired increment of time is determined for such conditions. The apparatus is particularly advantageous in measuring the oil consumption of different types of oil in an engine operated under known operating conditions and is also particularly useful in measuring oil consumption with different types of piston rings and other engine parts.

A further useful application is to determine the effect on oil consumption of changing engine operating conditions, such as speed, load, temperatures, etc., all of which may be accomplished in one period of operation without the necessity of stopping the engine or draining the oil.

The invention contemplates a system whereby the oil pan of an internal combustion engine has maintained therein a constant level of oil over the entire period of its operation. This is accomplished by providing a supplemental supply of oil for the engine from which oil is fed at a constant rate to replenish that which is used during the engine operation, and, in order to maintain the constant level, scavenge oil is withdrawn constantly at a predetermined level from the oil pan and returned to the supplemental supply receptacle. In order to maintain the constant level and determine the amount of oil which is being consumed, a receptacle is provided for the supplemental oil supply and the weight of the oil in the receptacle will decrease during the test, while the engine is in operation, and the decrease in weight of oil in the receptacle over any given period will be a direct measure of the weight of oil consumed by the engine during that period.

In carrying out the present invention, only three modifications need be made to the standard oiling system of the internal combustion engine: A portion of the normal filling of oil is removed to a supplemetal supply receptacle. A suction, or scavenge, line is inserted at a predetermined level in the crankcase through which any oil above this level is withdrawn and passed into the supplemental supply receptacle. A supply line is provided through which oil from the supplemental supply receptacle is passed to the engine at a controlled rate which is only sufficient to equal the engine consumption plus a small quantity to maintain circulation between the engine crankcase and the supplementary supply.

By keeping the supplementary supply small with respect to the crankcase capacity, more delicate consumption determination equipment can be used and the accuracy of the determination improved.

In carrying out the invention, a scale balance is utilized and the container for the supplemental oil is disposed on one pan of the balance while weight means is provided for the other pan in order to maintain the oil container in balance. Since oil is continuously circulated to and from the container and hence the weight of the container varies continuously, it is desirable to have a continuous indication of the weight variation. This is accomplished by providing a reversible motor for driving a shaft which is suitably geared to a counter. The motor is operated in one direction or the other through a pair of contacts which are alternately energized by a contact arm, the movement of which is controlled in accordance with the unbalance of a beam scale which carries or supports the container and the balancing weight means. As the weight of the container and oil varies from the normal, after the scale beam is set in balance, a particular type of weight is designed to compensate for the unbalanced condition of the beam scale and add weight to the weight pan or remove weight therefrom. To this end the particular weight utilized is in the form of a chain, the links of which are dropped on to the pan, or removed therefrom. In order to effect the movement of the chain weight, it is passed over a sprocket which is secured to the shaft to be rotatable therewith and a guide is provided to coil the chain evenly on the weight pan in order to prevent entanglement of the chain.

Figure 1:
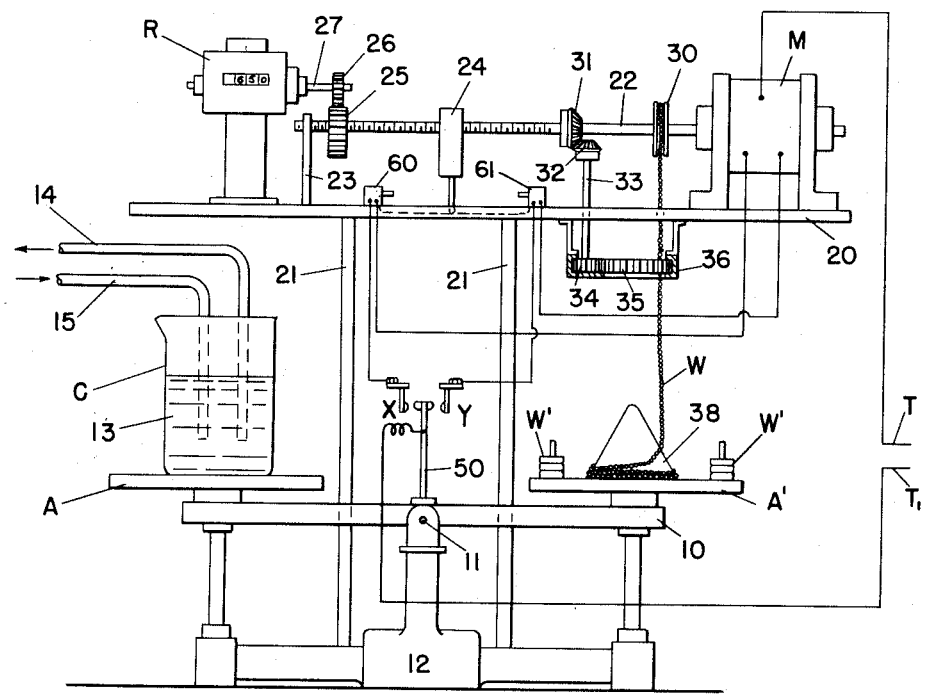
Figure 1 is a view in elevation of the oil measuring and indicating device.

Referring to Figure 1, numeral 10 indicates a scale beam which, as shown, is pivoted or fulcrumed at 11 to a support member generally indicated at 12. The scale beam 10 is provided with pans A and A', at either end, one of which is adapted to receive the weight means while the other pan receives the receptacle for the supplemental oil. In the figure, the pan A is shown as receiving the receptacle C having a volume of oil 13 therein, while the pan A' is arranged to receive the chain weight W and supplemental weights W'. The receptacle C is provided with a flexible tube 14 which delivers the oil from the receptacle to the engine 40 (not shown in Figure 1) and a flexible tube 15 which returns scavenge oil from the engine to receptacle C.

A platform 20 is positioned preferably directly above the scale assembly, and for example, may be secured thereto by posts 21—21. The platform 20 is arranged to carry a reversible motor M and the other elements of the apparatus for effecting the counting of the weight variation of the receptacle C on the counter R and also the elements designed to control the movement of the chain weight W. In order to accomplish this, a shaft 22 is provided having its driven end arranged to be actuated by the motor M and its free end rotatably secured in a bearing arm 23. A nut 24 is provided and is movable on the rotatable shaft 22, and a spur gear 25 is fixed to the shaft 22 adjacent its bearing end and a cooperating spur gear 26 is secured to counter shaft 27 to drive the counter mechanism in accordance with the rotation of the shaft 22 as it is driven by the motor M.

Figure 2:
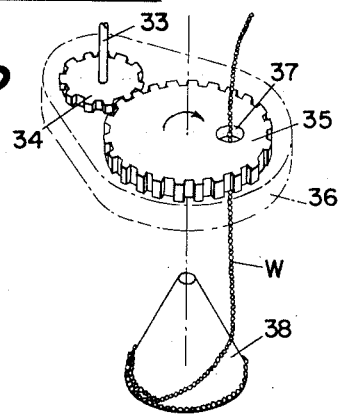
Figure 2 shows a detail of a portion of the apparatus for guiding the chain weight.

In order to control the movement of the chain weight W, a sprocket 30 is fixed to the shaft 22 at a point directly above the weight pan A' of the beam scale 10 and the chain is passed over this sprocket with its links engaged in the sprocket teeth so that the chain is removed from weight pan A' when the shaft 22 is rotated in one direction and is dropped on the weight pan A' when the shaft rotates in the opposite direction. In order to guide the movement of the chain weight W and to coil the chain weight on the pan A' guide means are provided which is shown in detail in Figure 2. To effect the coiling of the chain weight W, a miter gear 31 is fixed to shaft 22 which cooperates with and rotates a second miter gear 32 supported on a rotatable shaft 33 which extends through platform 20 having at its other end a spur gear 34 which in turn rotates a spur gear 35 carried by a rigid supporting and guide plate 36. The spur gear 35 is provided with an aperture 37 through which the chain weight W passes in its travel between the sprocket 30 and the weight pan A'. A cone 38 is fixed on the weight pan A' and is designed particularly to coact with the chain weight drive to provide an arrangement for the coiling of the chain in layers about the cone as the chain weight W is moved in accordance with the movement of shaft 22.

Figure 3:
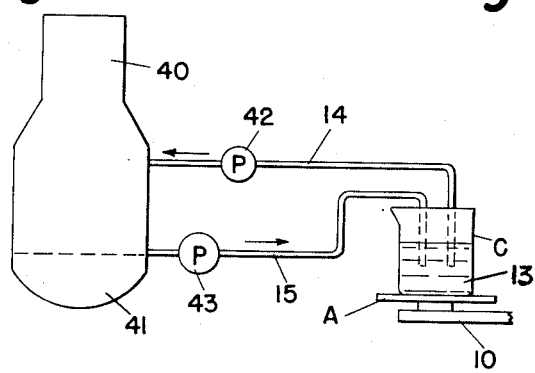
Figure 3 is a diagrammatic view showing a portion of the measuring and indicating apparatus in combination with an internal combustion engine.

Referring to Figure 3, which is a diagrammatic view of a portion of the invention, 40 generally indicates the internal combustion engine having at its lower end a section 41 to indicate the oil pan of the engine. Pan A of the beam scale 10 is shown as supporting the receptacle C having therein one end of a conduit 14, heretofore referred to, and its other end in communication with the engine 40 for supplying oil from the receptacle to the engine by means of supply pump 42. A second conduit 15 is in communication between the receptacle and the oil pan at a predetermined or desired level in order to withdraw or "scavenge" oil from the oil pan by means of scavenge pump 43 for passage to the receptacle C.

While engine 40 is running on a test, pumps 42 and 43 are driven by a power source, such as an electric motor, so that supply pump 42 delivers oil at a slow rate into the engine, while scavenge pump 43 withdraws oil and oil foam above the predetermined level in crankcase 41. The quantity of oil 13 in receptacle C thus represents the difference between the total amount of oil in the system and the amount up to the predetermined level in the crankcase.

In the operation of the device, the crank case will be supplied with oil and the receptacle C will be supplied with the desired volume of oil and placed on the pan A. Following this weights W' will be applied to the pan A' and sufficient of the chain weight W may also be applied to the pan A' to effect a balanced condition between receptacle pan A and the weight pan A'. During this time the contact arm 50 will be in circuit with the motor through contact X and the motor operated in one direction to increase the figures on the counter in accordance with the number of revolutions of the shaft 22. This condition exists also when more oil is added to receptacle C or when supplemental weights W' are removed from the pan A'. After the scale pans A and A' are in balance and it is desired to determine the rate of oil consumption, the arm 50, as the oil in the container is consumed, will only be in circuit with motor M through contact Y and the motor operated in only one direction to subtract figures from the counter through the operation of shaft 22 and counter shaft 27 during which time links of the chain weight W will be removed from the pan A'. It will be understood that the chain weight is removed from cone 38 or added thereon through the operation of miter gears 31 and 32, shaft 33 and spur gear 34.

From the above description of operation it will be seen that after the device is set for operation that the pans A and A' will be kept in balance as the weight of the oil in receptacle C decreases in weight by the operation of shaft 22 to take weight off the weight pan A'. As weight is taken off the weight pan, the counter R will indicate the amount of weight removed over any given period. Hence the change in reading of the figures on the counter over any given period of time will indicate or will be the amount of oil consumed by the engine.

As heretofore mentioned, the chain weight W is raised or lowered from the pan weight A' through the medium of sprocket 30 secured on shaft 32. It is preferred to utilize a chain for the weight and to leave the ends of the chain free so that one end will fall on the weight pan while the other end will extend over the sprocket 30 and the links of the chain be received in recesses formed in the sprocket. The guide means between the weight pan A' and sprocket 30 is provided to coil the weight chain uniformly about the cone 38.

The traveling nut 24 is provided to move in accordance with the rotation of the shaft 22 and limit switches 60 and 61 are fixed to the platform 20 at desired spaced points to reverse the operation of the motor, and hence prevent either end of the chain from traveling off the sprocket 30.

The number of links of chain which are moved during one rotation of shaft 22 will be known and the total weight removed or added during one rotation can be determined.

I claim:

In a balance for indicating changes in weight of material which comprises a pivoted beam carrying at one end a pan for the material and at the other end a weight pan, the improvement which comprises a support positioned above the pivoted beam, a reversible motor on said support, a shaft operable by said motor, a counter operable by said shaft, a drum on said shaft and positioned generally directly above the weight pan, a flexible weight having one end mounted for rotation with said drum and its other end depending freely therefrom, guide means for said flexible weight between its ends, connections between said guide means and said shaft to actuate the guide means in accordance with the shaft rotation to deposit lengths of the weight on or to remove lengths of the weight from said pan, a power source, a switch arm on the pivoted beam, a connection between the power source and the switch arm, another connection between the power source and the motor, a pair of contacts, connections between each of the contacts and the reversible motor, said contacts being alternately energized by the switch arm to operate the motor upon pivotal movement of the beam.

GEORGE J. LIDDELL.

References Cited in the file of this patent

UNITED STATES PATENTS

| Number | Name | Date |
| --- | --- | --- |
| 1,405,322 | Peterson | Jan. 31, 1922 |
| 1,484,358 | Norton | Feb. 19, 1924 |
| 1,878,554 | Townshend | Sept. 20, 1932 |
| 2,401,487 | Kistinger | June 4, 1946 |
| 2,409,982 | Longmate | Oct. 22, 1946 |
| 2,489,776 | Hooper | Nov. 29, 1949 |

FOREIGN PATENTS

| Number | Country | Date |
| --- | --- | --- |
| 332,457 | Italy | Nov. 29, 1935 |
| 816,908 | France | Aug. 20, 1937 |